June 24, 1930.  I. B. GILBERT  1,767,445
VALVE
Filed Aug. 30, 1924  3 Sheets-Sheet 1
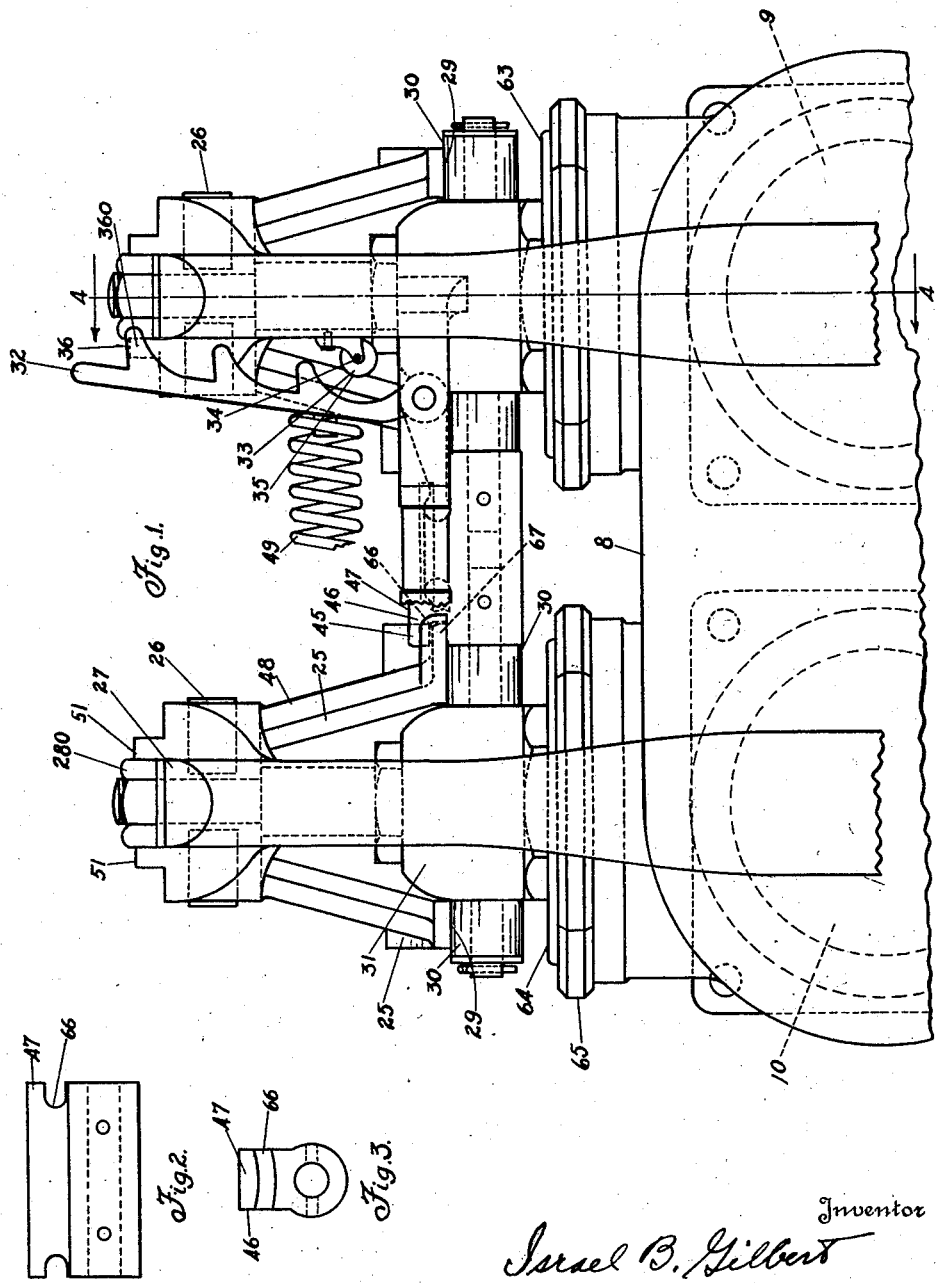
Inventor
Israel B. Gilbert
By Murray &  Qugelter
Attorneys

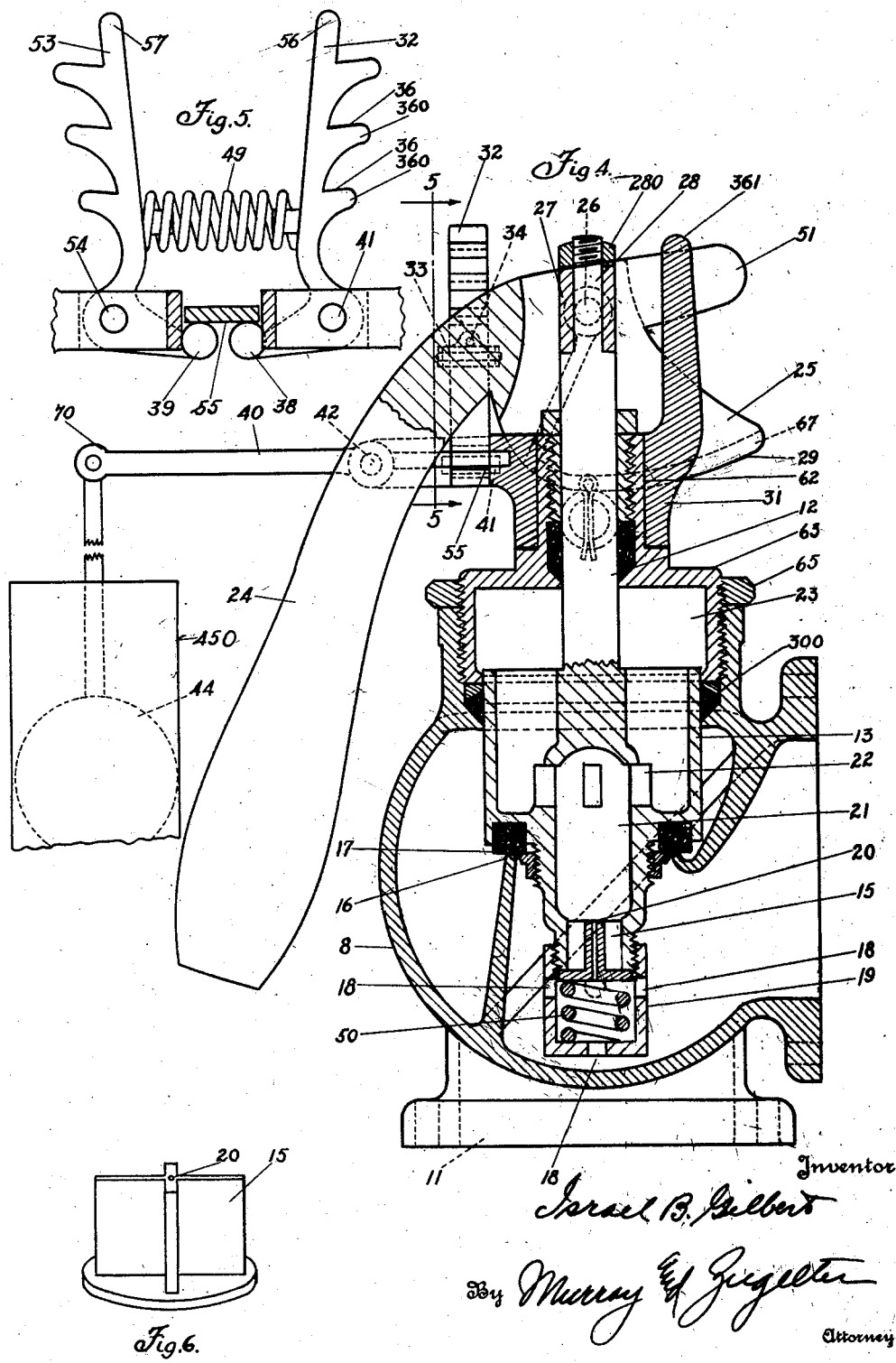

June 24, 1930.　　　I. B. GILBERT　　　1,767,445

VALVE

Filed Aug. 30, 1924　　　3 Sheets-Sheet 3

Inventor
Israel B. Gilbert
By Murray & Zugelter
Attorneys

Patented June 24, 1930

1,767,445

UNITED STATES PATENT OFFICE

ISRAEL B. GILBERT, OF CINCINNATI, OHIO

VALVE

Application filed August 30, 1924. Serial No. 735,124.

An object of my invention is to provide a valve for mixing two liquids in various different proportions, and which is automatic in its action.

Another object of my invention is to provide means for quickly and easily opening the valve without the use of the customary screw and threads which are slow in action, or of springs as are sometimes used.

Another object of my invention is to provide a means for utilizing the pressure of the liquid at the intake for retaining the valve in a normally closed position.

Another object of my invention is to provide a means whereby the valve closes slowly so as to prevent sudden jar which is detrimental to valves and fixtures connected thereto.

These and other objects are attained by the means described herein and disclosed in the accompanying drawings, in which:

Fig. 1 is a fragmental front elevation of a valve embodying my invention.

Fig. 2 is a plan view of a cam check forming a detail of my invention.

Fig. 3 is an end view of the cam check shown in Fig. 2.

Fig. 4 is a sectional view on line 4—4 of Fig. 1.

Fig. 5 is a sectional view on line 5—5 of Fig. 4.

Fig. 6 is a perspective view of an auxiliary relief and supply valve forming a detail of my invention.

Figure 7:
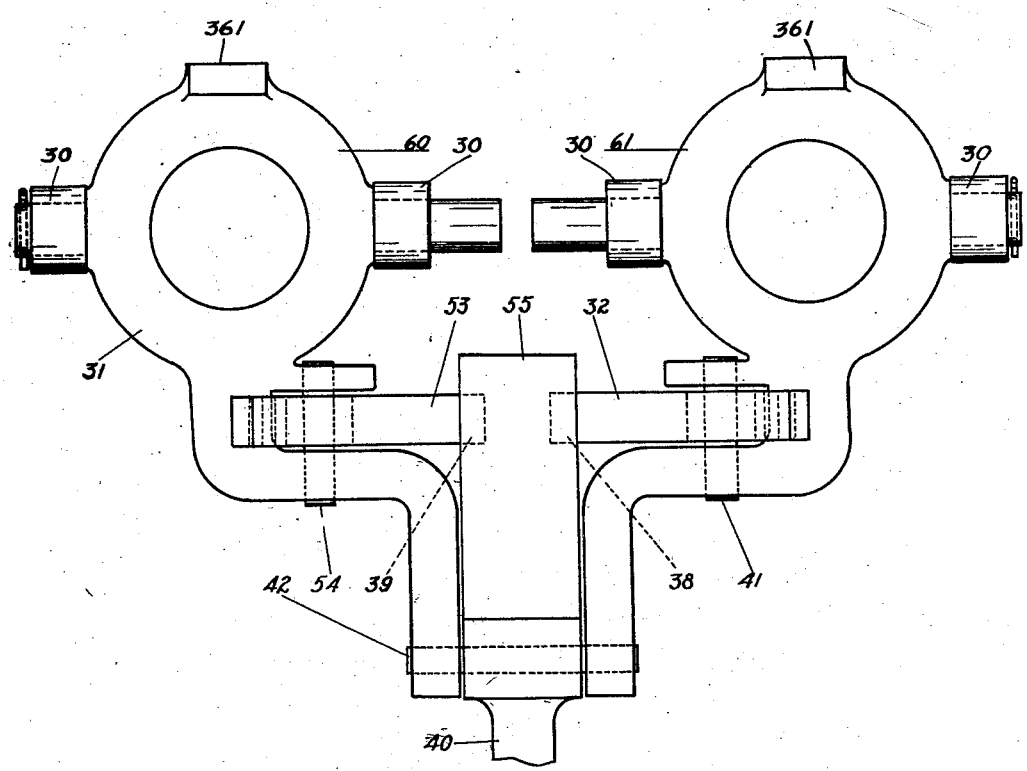
Fig. 7 is a plan view of a yoke forming a detail of my invention.

The valve housing 8 has two inlets 9 and 10 which communicate with a common outlet. Outlet 11 must be large enough to avoid development of back pressure or impedance to the flow of fluid. The stem 12 and cup 13 are integral. When the seat 16 and valve 17 are in engagement, all of these parts are in their lowermost positions. Fluid at the intake finds its way first through ports 18 in the cap 19, thence through the small central bore 20 of the auxiliary valve 15, into chamber 21, and by way of connecting ports 22, into chamber 23.

By this construction, it is evident that the same pressure of liquid is acting to close the valve as is acting to open it, but the area of the upper part of the valve 17 upon which the downward pressure acts is larger than that of the lower part on which the upward pressure acts, wherefore the primary valve is normally retained on its seat. As disclosed herein the cup 13 is approximately two and five eighths inches in diameter and the valve seat 16 is of approximately two inches diameter.

A handle 24 is provided with straddle cams 25 at its extremity. The cams carry pins 26 that engage in bores provided in the sleeve 27. The sleeve 27 fits over the small portion 28 of the stem 12, and is held thereon by a nut 280. The face 29 of the cam 25 bears on rollers 30 mounted on a yoke 31. Lifting the handle serves to raise the stem 12, which lifting is facilitated by the opening of the relief and supply valve 15 under the increased pressure created thereby in the chambers 23 and 21. The valve 15 opens against the yielding force of the spring 50. The handle is held in an inclined position by means of a ratchet 32 which engages a pivotally mounted roller 33 on the handle 24. The roller 33 is pivoted on a pin 34 so that the face 35 of the roller 33 conforms to the faces 36 of the lugs 360 at all degrees of inclination of the handle 24. To insure simultaneous closure of the valves 17, the uppermost lugs 36 of the ratchets 32 are made shorter than the lower ones to compensate for the axis about which the ratchet moves being set to one side of the line of vertical reciprocation of the roller 33. The several lugs 360 permit different inclinations of the handles 24 so that liquids may be mixed in various proportions. An upwardly extending arm 361 on the yoke 31 is provided for prevention of the movement of handle 24 and stem 12 in a horizontal plane. The arm 361 extends between the extensions 51 formed on the rear of each straddle cam 25. The yoke 31 is composed of two pieces 60 and 61 which are slipped over each upwardly extending portion 62 of the bonnets 63 and 64. A lock nut 65 securely holds the bonnet 63 in the housing 8. The yoke portions 60 and 61 may be removed by taking off the nut 280 and lifting off the handles 24. The pin 42 and cam check 47 hold the portions 60 and 61 in their relative positions. The ratchets 32 and 53 are pivotally mounted on pins 41 and 54 respectively on the yoke 31. Extensions 38 and 39 on the ratchets 32 and 53 respectively engage one end 55 of a lever 40 pivoted at 42 on the yoke 31. By means of a float 44 in a tank 450 or by any other suitable means, the end 70 of the lever 40 is raised upwardly to exert a downward force on the extensions 38 and 39. Thus, the ends 56 and 57 of the ratchets 32 and 53 respectively are moved towards each other against the compression of the spring 49, and the rollers 33 leave the faces 36, permitting the building up of pressure in the chamber 23 to seat the valve 17. The reduced opening 20 permits a slow building up of pressure in the chamber 23 for seating the valve 17 and thereby precludes jarring of the device. The handle 24 is arrested at the end of its downward movement by means of a lug 45 on the cam 25 making contact with the face 46 of a cam check 47. The cam 25 carries a rib or fin 67 that extends into a slot or way 66 in the cam check 47. The lower face 29 of the rib engages and slides over the lower wall of the way or slot 66 in the cam check when the handle is lifted. The upper face of the fin engages the upper wall of the way or slot 66 as the handle tends to descend because of the action of gravity upon the handle. The fin and the two indicated opposed faces thereon are eccentric in relation to the axes of the pins 26 that pivotally connect the handle 24 and the valve stem, wherefore, upon lifting the handle the contact of the lower fin face upon the lower wall of the way or slot 66 elevates or projects the valve stem upwardly from the housing and upon release of the mechanisms for seating the valve, the contact of the upper faces on the fin and the cam check serves to preclude falling of the handle except in proportion to the movement of the valve stem as the valve moves toward its seat. This action precludes injury to any of the parts that might be occasioned by the unchecked dropping or falling of the handle under the influence of gravity, after the handle has been released to permit the valve to seat. A rib 48 on the cam 25 is designed to strengthen the came at the forward portion thereof so that a maximum strength is provided in that portion of the cam that must meet and overcome the pressures operating upon the primary valve 17, when such primary valve is opened.

The operation of my device is as follows:
Assuming a twin valve as disclosed herein is installed for controlling the flow of hot and cold water to a washing machine, an operator would lift the handle 24 of the valve associated with the cold water for a determinable distance, a ratchet mechanism holding the valve in this lifted position. A handle 24 associated with the hot water valve, would then be lifted so as to permit the flow of hot water in such proportion to the flow of cold water as the operator might wish. The ratchet mechanism associated with the hot water valve would then retain the hot water valve in selected position. At the time the respective handles 24, associated with the valves are lifted, the fluid under pressure in the chamber 23 is speedily exhausted by way of the auxiliary valve 15. This speedy evacuation of fluid from the chamber 23 is effected because of the auxiliary valve moving against the yielding resistance of the spring 50, the fluid finding its way between the vanes forming part of the valve 15. When the primary valve has been positioned at the desired place, the auxiliary valve will be returned to its seat and would close communication between the inlet port and the chamber 23, except for the restricted passage 20 formed through the valve 15. The lifting of the primary valve is effected by the cam faces 29, passing over the rollers 30, thereby moving the valve stem 12 longitudinally of itself. The float 44 would be so positioned that it could be raised and lowered in accordance with the rise and fall of water within the washing machine or the like, consequently when the desired volume of water had been admitted to the washing machine the lever 40 would be moved about its pivotal mounting 42 for withdrawing the ratchets from the rollers 33, whereupon the primary valve would be free to seat. During the time that the primary valve is being held off of its seat, no fluid could find its way into the chamber 23 for the resistance of the fluid in the chamber 23 would preclude the entry of more fluid thereinto, however, upon the release of the valve stem the primary valve would be free to move towards its seat as water is admitted to the chamber 23, wherefore fluid would flow to the chamber 23 and would eventually seat the primary valve. From the foregoing it will be readily evident that by positioning the primary valves at various distances from their seats, various proportions of hot and cold water may be run into a wash tub or the like, and that after an operator had opened the valves, he would be free to attend to his other duties, the valve being automatically closed when the desired level of the fluid in the wash machine had been attained. The bonnet retains packing 300 in position.

What I claim is:
1. A valve of the class described comprising a housing having a valve seat therein, a reciprocating valve stem extending into the housing, a primary valve carried by the stem and having a cup-like extension adapted to engage the valve seat, the cup-like extension reciprocally engaging the housing and with a portion of the housing forming a pressure chamber, the valve stem having a way therethrough for establishing communication between the pressure chamber and a supply of fluid under pressure controlled by the primary valve, the primary valve having unequal opposed faces exposed to a fluid under pressure in relation such that the primary valve is normally retained upon its seat, an auxiliary valve carried by the valve stem and arranged for relatively slow filling and fast discharge of the pressure chamber, and means for actuating the valve stem for opening the primary and secondary valves and for effecting a rapid discharge from the pressure chamber.

2. A valve of the class described comprising a housing having a valve seat therein, a reciprocating valve stem extending into the housing, a primary valve carried by the stem and having a cup-like extension adapted to engage the valve seat, the cup-like extension reciprocally engaging the housing and with a portion of the housing forming a pressure chamber, the valve stem having a way therethrough for establishing communication between the pressure chamber and a supply of fluid under pressure controlled by the primary valve, the primary valve having unequal opposed faces exposed to a fluid under pressure in relation such that the primary valve is normally retained upon its seat, an auxiliary valve carried by the valve stem and arranged for relatively slow filling and fast discharge of the pressure chamber, means for actuating the valve stem for opening the primary and secondary valves and for effecting a rapid discharge from the pressure chamber, means for withholding the primary valve from its seat, and float controlled means for releasing the primary valve from the withholding means whereby to permit building up of pressure within the pressure chamber to seat the primary valve.

3. In a valve the combination of a housing provided with an inlet port and an exhaust port, a valve seat formed in the housing between the inlet port and the exhaust port, the inlet port being restricted relative to the exhaust port, a valve stem extending reciprocally through the valve seat, a cup valve carried by the valve stem and arranged for engagement upon the discharge port side of the valve seat, the cup engaging the housing and providing therewith a confined chamber in which the cup may reciprocate for seating and unseating the valve, the valve stem having a way therein for establishing communication between the chamber and the inlet port, an auxiliary valve in the way in the stem and arranged for slow filling and relatively faster discharging of the chamber, and means for actuating the stem for lifting the valve seat and for discharge from the pressure chamber.

4. In a valve the combination of a housing provided with an inlet port and an exhaust port, a valve seat formed in the housing between the inlet port and the exhaust port, the inlet port being restricted relative to the exhaust port, a valve stem extending reciprocally through the valve seat, a cup valve carried by the valve stem and arranged for engagement upon the discharge port side of the valve seat, the cup engaging the housing and providing therewith a confined chamber in which the cup may reciprocate for seating and unseating the valve, the valve stem having a way therein for establishing communication between the chamber and the inlet port, an auxiliary valve in the way in the stem and arranged for slow filling and relatively faster discharging of the chamber, a lever pivotally carried by the stem exteriorly of the housing, and comprising a straddle cam, the straddle cam engaging the housing and having cam faces eccentric to the pivotal mounting of the lever on the valve stem whereby relative movement of the cam faces and the housing serves to reciprocate the valve stem.

5. In a valve the combination of a housing provided with an inlet port and an exhaust port, a valve seat formed in the housing between the inlet port and the exhaust port, the inlet port being restricted relative to the exhaust port, a valve stem extending reciprocally through the valve seat, a cup valve carried by the valve stem and arranged for engagement upon the discharge port side of the valve seat, the cup engaging the housing and providing therewith a confined chamber in which the cup may reciprocate for seating and unseating the valve, the valve stem having a way therein for establishing communication between the chamber and the inlet port, an auxiliary valve in the way in the stem and arranged for slow filling and relatively faster discharging of the chamber, a lever pivotally carried by the stem exteriorly of the housing, and comprising a straddle cam, the straddle cam engaging the housing and having cam faces eccentric to the pivotal mounting of the lever on the valve stem whereby relative movement of the cam faces and the housing serves to reciprocate the valve stem, means for retaining the lever in position for withholding the cup valve from its seat, and float controlled means for releasing the lever whereby the valve may be returned to its seat.

6. The combination of a pair of valve housing, a reciprocating valve stem for each housing, a cup carried by each stem, each housing having a chamber therein in which a cup may reciprocate, each cup acting as a valve, a valve seat within each housing for engagement by the cup, an auxiliary valve establishing communication between the opposite sides of the cup, the opposite faces of the cup being of unequal exposed areas when seated whereby fluid pressure operating upon the said exposed faces of the cup normally retains the cup upon its seat, a lever associated with each valve stem for lifting the cup from its seat, means adapted for withholding both cups from their seats at different distances for attaining differential flow through said pair of valve housings, and means for simultaneously releasing both the valve stems and cups from said withholding means whereby the cups may return to their seats.

7. The combination of a pair of valve housings, a reciprocating valve stem for each housing, a cup carried by each stem, each housing having a chamber therein in which a cup may reciprocate, each cup acting as a valve, a valve seat within each housing for engagement by the cup, an auxiliary valve establishing communication between the opposite sides of the cup, the opposite faces of the cup being of unequal exposed areas when seated whereby fluid under pressure operating upon the said exposed faces of the cup normally retains the cup upon its seat, a lever associated with each valve stem for lifting the cup from its seat, means for individually withdrawing and withholding the cups from their seats for determinable distances whereby to establish determinable ratios of flow of fluid through said housings, and means for simultaneously releasing the cups from said withholding means for effecting simultaneous seating of the cups.

8. The combination of a pair of valve housings, a reciprocating valve stem for each housing, a cup carried by each stem, each housing having a chamber therein in which a cup may reciprocate, each cup acting as a valve, a valve seat within each housing for engagement by the cup, an auxiliary valve establishing communication between the opposite sides of the cup, the opposite faces of the cup being of unequal exposed areas when seated whereby fluid pressure operating upon the said exposed faces of the cup normally retains the cup upon its seat, a lever associated with each valve stem for lifting the cup from its seat, selective means for withholding both cups selective distances from their respective seats, and means for simultaneously releasing the valves from said selective withholding means whereby the cups may return to their respective seats.

9. In a laundry valve the combination with a housing, having inlet and outlet ports and a valve and a valve seat between the ports, of a reciprocating cup valve comprising a cylindrical wall and a valve stem, a packing ring carried by the housing and having annular contact on the cylindrical wall of the valve, a bonnet for clamping the packing ring against the cylindrical wall, the stem extending through the bonnet, a plug carried by the bonnet and surrounding the stem, and a packing ring having contact with the stem and held against the stem by the plug, whereby the valve may reciprocate in contact with the packing rings only.

10. In a device of the class described the combination of a valve housing, a valve comprising a stem and having unequal opposite faces exposed to fluid under pressure, a handle pivotally mounted on the valve stem, a cam on the handle, the cam contacting the housing whereby lifting of the handle moves the cam over the housing for opening the valve, and means for precluding falling of the handle independently of the closing of the valve.

11. In a device of the class described the combination of a valve housing, a valve comprising a stem and having unequal opposite faces exposed to fluid under pressure, a handle pivotally mounted on the valve stem, and a cam on the handle, the cam contacting the housing whereby lifting of the handle moves the cam over the housing for opening the valve.

12. In a device of the class described the combination of a valve housing having a valve seat thereon, an inlet and an outlet port on opposite sides of the valve seat, a reciprocating valve in the housing adapted to contact the valve seat, the valve having a stem extending from the housing, a handle pivotally mounted on the stem, a cam carried by the handle and having an eccentric cam face contacting the housing and raising the valve stem when the handle is lifted, means for retaining the handle in a raised position, means for releasing the handle, and means for checking the falling of the handle from its raised position and comprising an eccentric fin carried by the cam, and a plate secured to the housing and having a way formed therein into which the fin extends, the contact of the fin upon the wall of the way checking the descent of the handle.

13. In a device of the class described the combination of a valve housing having a valve seat therein, an inlet and outlet port on opposite sides of the valve seat, a reciprocating valve in the housing for contact upon the valve seat, the valve having a stem extending from the housing, a handle pivotally mounted on the stem, a fin carried by the handle and having a pair of opposed faces eccentric to the pivotal mounting of the handle on the stem, the housing having associated with it a grooved check member for receiving the fin on the handle, the opposed eccentric faces on the fin adapted to engage the opposed walls of the groove in the check member for alternately raising the valve stem by lifting the handle, and checking the descent of the handle when released in its upper position.

14. The combination of a housing having a valve seat, a valve for said seat, a valve stem, a valve stem actuating handle having a pivotal contact with the valve stem, the housing having a way formed in it, and a fin carried by the handle and eccentric to the pivotal contact of the handle and valve stem, said fin extending into said way in the housing, contact of opposite sides of the fin on opposite walls of said way serving to project the valve stem in one direction relative to the housing, upon movement of the handle about its pivotal contact and to check movement of the handle about its pivotal contact, upon movement of the valve stem in the opposite direction.

15. The combination with a valve housing having a seat therein of a reciprocating valve having unequal areas thereon exposed to fluid under pressure for normally retaining the valve upon its seat, a valve stem for the valve, a handle having a pivotal mounting upon the valve stem, a fin formed on the handle eccentric to the pivotal mounting of the handle and stem and a grooved check member associated with the housing, receiving the fin whereby movement of the handle about its pivotal mounting causes the fin to move through the grooved way for unseating the valve, and the return of the fin through said grooved way checks the relative movement of the handle and the valve stem and assures return of the handle to its normal position simultaneously with the return of the valve to its normal seated position.

16. In combination a housing having an inlet port and an exhaust port, a valve seat intermediate said ports and a reciprocating valve for engagement with the seat, the housing having a pressure chamber therein in communication with the inlet port, the valve being exposed to the pressure chamber and having unequal areas normally exposed to the pressure of fluid in the pressure chamber and to the pressure of fluid in the inlet port for retaining the valve on its seat and means for positively raising the valve from its seat and for increasing the pressure in the pressure chamber for exhausting fluid therefrom into the housing adjacent the inlet port.

17. The combination of a valve housing comprising a valve seat and having an inlet chamber on one side of the valve seat and an outlet chamber on the opposite side of the valve seat, a reciprocating main valve in the outlet chamber having a face on one side for contacting the valve seat and having its opposite side exposed to a pressure chamber formed in the outlet chamber, the main valve serving to seal the pressure chamber from the outlet chamber, an auxiliary valve structure carried by the main valve for effecting relative slow filling and rapid discharge of the pressure chamber from and into the inlet chamber and a valve stem for the main valve adapted to be moved for simultaneously increasing the pressure in the pressure chamber whereby to open the auxiliary valve for exhausting the pressure from the pressure chamber and positively opening the main valve.

In testimony whereof, I have hereunto subscribed my name this 27th day of August, 1924.

ISRAEL B. GILBERT.